(No Model.)

G. J. FANNER & J. H. KIRKWOOD.
FORK.

No. 561,101.              Patented June 2, 1896.

Witnesses.
E. B. Gilchrist
Ella E. Tilden

Inventors.
George J. Fanner
and
John H. Kirkwood
By Lynch, Dyer & Donnelly.
Their Attorneys.

UNITED STATES PATENT OFFICE.

GEORGE J. FANNER AND JOHN H. KIRKWOOD, OF CLEVELAND, OHIO, ASSIGNORS TO THE FANNER MANUFACTURING COMPANY, OF SAME PLACE.

FORK.

SPECIFICATION forming part of Letters Patent No. 561,101, dated June 2, 1896.

Application filed February 24, 1896. Serial No. 580,406. (No model.)

*To all whom it may concern:*

Be it known that we, GEORGE J. FANNER and JOHN H. KIRKWOOD, of Cleveland, Cuyahoga county, Ohio, have invented certain new and useful Improvements in Forks; and we do hereby declare the following to be a full, clear, and exact description of the invention, such as will enable others skilled in the art to which it pertains to make and use the same.

Our invention relates to forks, and more especially to such as are known as "carving-forks;" and it consists in the peculiar manner of constructing the same, as will be hereinafter more fully set forth and claimed.

Figure 1:
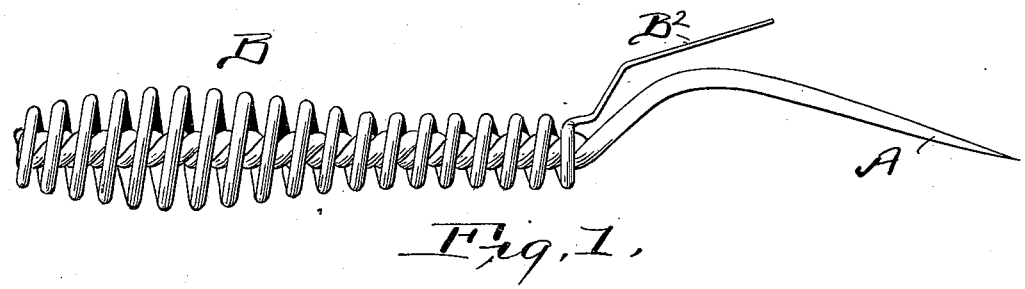
Figure 2:
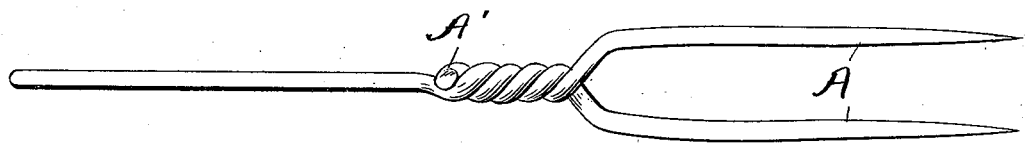
Figure 3:
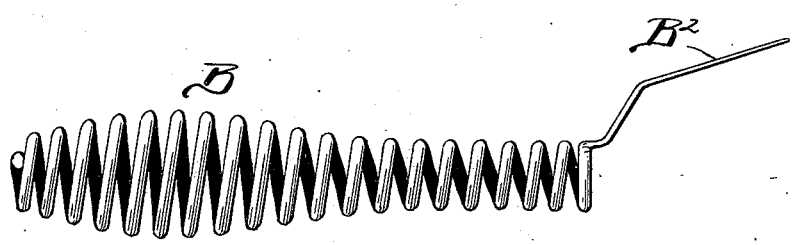

Figure 1 is a view in side elevation of a fork embodying our invention. Fig. 2 is a view representing the fork with handle removed and showing another manner of forming the tines and shank by twisting the wires part way only. Fig. 3 is a view representing the handle detached and showing the mode of forming the guard.

A A represent the tines of our improved fork, which are formed of wire and have the usual curves. These tines may be held together, as shown in Fig. 1—viz., by twisting the two wires together the full length of the shank A—or the wire forming one of the tines may be twisted with or around the other wire a short distance only, as shown in Fig. 2, at A'.

B represents a coiled-wire handle, which is so formed as to closely hug the shank A at both ends. At the end of the handle nearest the tines a portion of the wire forming the coiled handle is preferably flattened and bent at such angle or angles to the handle and tines as to form the guard $B^2$. The handle B is secured to the shank A of the fork by causing it to hug the said shank when forced or placed thereon.

By our improved construction it will be seen that a very strong and neat fork is provided at a very small cost, and that it serves its purpose fully in all respects.

What we claim is—

1. A coiled-wire handle for a fork, provided at its end nearest the tines with a guard formed of the same wire as the handle, substantially as shown and described.

2. In a carving-fork, the combination with the tines and shank, both formed of wire, of a coiled-wire handle, and guard formed integral with the coiled-wire handle, substantially as shown and described.

In testimony whereof we sign this specification, in the presence of two witnesses, this 19th day of February, 1896.

GEORGE J. FANNER.
JOHN H. KIRKWOOD.

Witnesses:
W. E. DONNELLY,
ELLA E. TILDEN.